United States Patent
Kim et al.

(10) Patent No.: US 9,042,001 B2
(45) Date of Patent: May 26, 2015

(54) ELECTROPHORETIC DISPLAY APPARATUS AND METHOD THEREOF

(75) Inventors: Myung-Eun Kim, Seongnam-si (KR); Sangil Kim, Yongin-si (KR); Gilhwan Yeo, Hwaseong-si (KR); Yujin Kim, Yongin-si (KR); Byungseok Choi, Seoul (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 0 days.

(21) Appl. No.: 13/437,391

(22) Filed: Apr. 2, 2012

(65) Prior Publication Data
US 2013/0050805 A1    Feb. 28, 2013

(30) Foreign Application Priority Data
Aug. 22, 2011    (KR) .................... 10-2011-0083610

(51) Int. Cl.
  *G02B 26/00* (2006.01)
  *G02B 26/08* (2006.01)
  *G02F 1/29* (2006.01)
  *G02F 1/167* (2006.01)

(52) U.S. Cl.
  CPC ........ *G02F 1/167* (2013.01); *G02F 2001/1676* (2013.01)

(58) Field of Classification Search
  USPC .................. 359/237, 242–247, 290–296, 298
  See application file for complete search history.

(56) References Cited

U.S. PATENT DOCUMENTS

| | | | |
|---|---|---|---|
| 6,750,844 B2 | 6/2004 | Nakanishi | |
| 6,873,451 B2 * | 3/2005 | Ukigaya | 359/296 |
| 7,006,277 B2 | 2/2006 | Mizuno | |
| 7,038,656 B2 | 5/2006 | Liang et al. | |
| 7,439,948 B2 | 10/2008 | Johnson et al. | |
| 7,561,234 B2 * | 7/2009 | Konno et al. | 349/141 |
| 7,903,320 B2 * | 3/2011 | Abe et al. | 359/296 |
| 8,817,004 B2 * | 8/2014 | Lu et al. | 345/211 |
| 2005/0012981 A1 * | 1/2005 | Miura et al. | 359/296 |
| 2006/0055862 A1 * | 3/2006 | Choi | 349/143 |
| 2006/0072193 A1 * | 4/2006 | Johnson | 359/430 |
| 2006/0087479 A1 * | 4/2006 | Sakurai et al. | 345/48 |
| 2009/0147348 A1 * | 6/2009 | Oshika | 359/296 |
| 2010/0091218 A1 * | 4/2010 | Rho et al. | 349/68 |

FOREIGN PATENT DOCUMENTS

| | | |
|---|---|---|
| JP | 2006-243364 | 9/2006 |
| JP | 3862906 | 10/2006 |

OTHER PUBLICATIONS

English Abstract for Publication No. 2006-243364.
English Abstract for Publication No. JP 3862906.

* cited by examiner

*Primary Examiner* — Scott J Sugarman
*Assistant Examiner* — Brandi Thomas
(74) *Attorney, Agent, or Firm* — F. Chau & Associates, LLC

(57) ABSTRACT

An electrophoretic display apparatus includes an array substrate, an opposite substrate facing the array substrate, and an electrophoretic layer disposed between the array substrate and the opposite substrate. The electrophoretic layer includes a non-polar solvent and a plurality of polar particles dispersed in the non-polar solvent. At least one of the array substrate or the opposite substrate includes a plurality of electric field forming electrodes respectively.

18 Claims, 4 Drawing Sheets

ELECTROPHORETIC DISPLAY APPARATUS AND METHOD THEREOF

CROSS-REFERENCE TO RELATED APPLICATION

This application relies for priority upon Korean Patent Application No. 10-2011-0083610 filed on Aug. 22, 2011, the contents of which are herein incorporated by reference in their entirety.

BACKGROUND

1. Technical Field

The present disclosure relates to an electrophoretic display apparatus. More particularly, the present disclosure relates to an electrophoretic display apparatus for displaying a gray scale image.

2. Description of Related Art

In general, an electrophoretic display apparatus displays an image using an electrophoretic phenomenon in which electrified colored particles move under the influence of an electric field. The electrophoretic display apparatus includes two substrates facing each other, each substrate including an electrode. The electrophoretic display apparatus further includes an insulating material filled in between the two substrates, and electrified particles distributed in the insulating material. When a power source is applied to the electrode disposed on each substrate to generate the electric field, the electrified particles move along the electric field, so that the electrophoretic display apparatus displays various gray scales.

However, it may be difficult to uniformly generate the electric field between the two substrates of the electrophoretic display apparatus. Accordingly, the movement of the electrified particles may be difficult to control, thereby causing difficulty in displaying various gray scales in the electrophoretic display apparatus.

SUMMARY

According to an exemplary embodiment of the present disclosure, an electrophoretic display apparatus includes an array substrate, an opposite substrate facing the array substrate, and an electrophoretic layer disposed between the array substrate and the opposite substrate. The electrophoretic layer includes a non-polar solvent and a plurality of polar particles dispersed in the non-polar solvent and at least one of the array substrate or the opposite substrate includes a plurality of electric field forming electrodes.

According to an exemplary embodiment of the present disclosure, the array substrate includes a first base substrate including a plurality of pixel areas, a first pixel electrode disposed in each pixel area, a first insulating layer covering the first pixel electrode, and a plurality of second pixel electrodes disposed on the first insulating layer.

According to an exemplary embodiment of the present disclosure, the opposite substrate includes a second base substrate facing the first base substrate, a first common electrode facing the first pixel electrode, a second insulating layer covering the first common electrode, and a plurality of second common electrodes disposed on the second insulating layer.

According to an exemplary embodiment of the present disclosure, the electric field forming electrodes include the second pixel electrodes and the second common electrodes.

According to an exemplary embodiment of the present disclosure, the second pixel electrodes are arranged in a lattice shape and positioned at cross-positions of the lattice shape to have a first island pattern, and the second common electrodes are positioned at center positions of the lattice shape to be arranged in a second island pattern.

According to an exemplary embodiment of the present disclosure, the second pixel electrodes are spaced apart from each other at a first regular interval and the second common electrodes are spaced apart from each other at a second regular interval.

According to an exemplary embodiment of the present disclosure, a distance between the second pixel electrodes and a distance between the second common electrodes satisfy the following equation of $2a \le d \le 2a+2b$, where "a" is a distance between the array substrate and the opposite substrate and "b" is a diameter or a width of the second pixel electrodes for determining the distance between the second pixel electrodes and "b" is a diameter or a width of the second common electrodes for determining the distance between the second common electrodes.

According to an exemplary embodiment of the present disclosure, a distance between the second pixel electrodes and the distance between the second common electrodes satisfy the following equation of $d=2a+b$, where "a" is a distance between the array substrate and the opposite substrate and "b" is a diameter or a width of the second pixel electrodes for determining the distance between the second pixel electrodes and a diameter or a width of the second common electrodes for determining the distance between the second common electrodes.

According to an exemplary embodiment of the present disclosure, the second pixel electrodes and the second common electrodes have a circular shape and the diameter of each of the second pixel electrodes is equal to the diameter of each of the second common electrodes.

According to an exemplary embodiment of the present disclosure, the second pixel electrodes and the second common electrodes have a rectangular shape and the width of each of the second pixel electrodes is equal to the width of each of the second common electrodes.

According to an exemplary embodiment of the present disclosure, either the array substrate or the opposite substrate further includes a white reflective layer and the polar particles have a black color.

According to an exemplary embodiment of the present disclosure, either the array substrate or the opposite substrate further includes an anti-reflective layer and the polar particles have a white color.

According to an exemplary embodiment of the present disclosure, the first pixel electrode, the first common electrode, and the second common electrodes are applied with a same electric potential voltage, the second pixel electrodes are applied with an electric potential voltage different from the electric potential voltage applied to the first pixel electrode to control the polar particles to be dispersed in the non-polar solvent to display a gray scale.

According to an exemplary embodiment of the present disclosure, an electrophoretic display apparatus includes an array substrate comprising a plurality of pixel electrodes, an opposite substrate facing the array substrate and comprising a plurality of common electrodes, and an electrophoretic layer disposed between the array substrate and the opposite substrate and including a non-polar solvent and a plurality of polar particles dispersed in the non-polar solvent, wherein the pixel electrodes are arranged in a lattice shape and positioned at cross-positions of the lattice shape to have a first island pattern, and the common electrodes are positioned at center positions of the lattice shape to be arranged in a second island pattern.

According to an exemplary embodiment of the present disclosure, a method for controlling a brightness of the electrophoretic display apparatus comprising an electrophoretic layer disposed between an array substrate comprising a plurality of pixel electrodes and an opposite substrate comprising a plurality of common electrodes, the electrophoretic layer including a non-polar solvent and a plurality of polar particles dispersed in the non-polar solvent, the method comprising controlling an arranging of the polar particles according to an electric potential difference between the array substrate and the opposite substrate.

BRIEF DESCRIPTION OF THE DRAWINGS

Exemplary embodiments of the present disclosure will become readily apparent by reference to the following detailed description when considered in conjunction with the accompanying drawings wherein.

DETAILED DESCRIPTION OF EXEMPLARY EMBODIMENTS

Hereinafter, embodiments of the present disclosure will be explained in detail with reference to the accompanying drawings.

Figure 1:
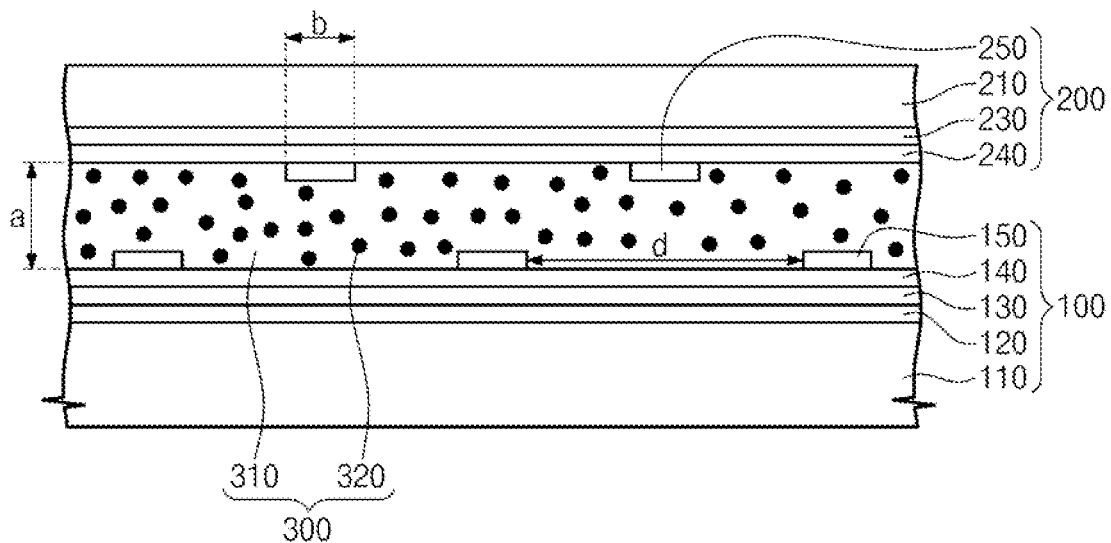
FIG. 1 is a cross-sectional view showing an electrophoretic display apparatus according to an exemplary embodiment of the present disclosure.
Figure 2:
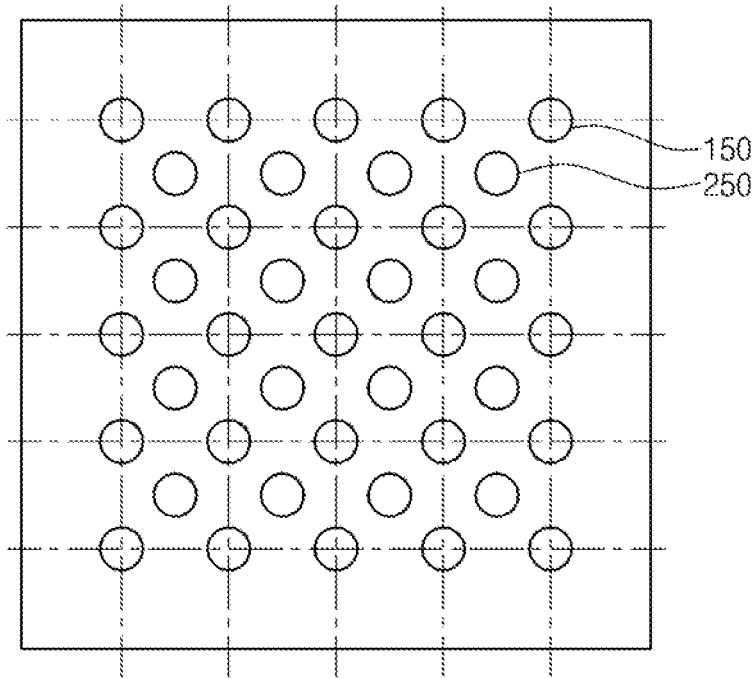
FIG. 2 is a plan view showing arrangements of second pixel electrodes and second common electrodes shown in FIG. 1.

FIG. 1 is a cross-sectional view showing an electrophoretic display apparatus according to an exemplary embodiment of the present disclosure and FIG. 2 is a plan view showing arrangements of second pixel electrodes and second common electrodes shown in FIG. 1.

Referring to FIGS. 1 and 2, an electrophoretic display apparatus includes an array substrate 100, an opposite substrate 200 facing the array substrate 100, and an electrophoretic layer 300 disposed between the array substrate 100 and the opposite substrate 200.

The array substrate 100 includes a first base substrate 110 having a plurality of pixel areas, a first pixel electrode 130 disposed in each pixel area, a first insulating layer 140 covering the first pixel electrode 130, and a plurality of second pixel electrodes 150 disposed on the first insulating layer 140.

The first base substrate 110 includes a display area (not shown) and a peripheral area (not shown) in which peripheral circuits are provided. The pixel areas of the first base substrate 110 are arranged in the display area in a matrix form. In addition, each pixel area may include a gate line (not shown) extended in a first direction substantially parallel to a side of the array substrate 110, a data line (not shown) extended in a second direction substantially perpendicular to the first direction, and a thin film transistor electrically connected to the gate line and the data line. The data line is insulated from the gate line while crossing with the gate line.

An optical functional layer may be disposed on the first base substrate 110 on which the gate line, the data line, and the thin film transistor are disposed. The optical functional layer includes a material to reflect a light incident thereon. For example, the optical functional layer includes a metal material or a white photoresist, such as titanium dioxide, to reflect the light incident thereon from the outside. The optical functional layer may be a white reflective layer 120 to reflect the light incident thereto from the opposite substrate 200.

The white reflective layer 120 may be disposed on the array substrate 100, but is not be limited thereto or thereby. That is, the white reflective layer 120 may be disposed on the opposite substrate 200. In the case that the white reflective layer 120 is disposed on the opposite substrate 200, the white reflective layer 120 reflects the light incident through the array substrate 100.

The first pixel electrode 130 is disposed in each pixel area on the white reflective layer 120 and is electrically connected to the thin film transistor and the thin film transistor switches a driving signal applied to the first pixel electrode 130. The first pixel electrode 130 may include a transparent conductive material, such as indium tin oxide (ITO).

The first insulating layer 140 is disposed on the first pixel electrode 130 and the second pixel electrodes 150. Each of the second pixel electrodes 150 may have a circular shape or a rectangular-shaped island pattern and are disposed on the first insulating layer 140. The second pixel electrodes 150 may include the transparent conductive material, such as indium tin oxide. The second pixel electrodes 150 may be spaced apart from each other at regular intervals. For example, the second pixel electrodes 150 are arranged in a lattice shape and each second pixel electrode 150 is positioned at the cross-position of the lattice shape. In addition, the second pixel electrodes 150 are electrically connected to the first pixel electrode 130 to generate an electric field in cooperation with the first pixel electrode 130. Further, the second pixel electrodes 150 may be electrically connected to a driver integrated circuit (IC) electrically insulated from the first pixel electrode 130 and disposed in the peripheral area to independently generate the electric field.

The driver IC receives various signals from an external device (not shown) and outputs the driving signal to the thin film transistor in response to the signals.

The first pixel electrode 130 may be omitted from the electrophoretic display apparatus. In this case, the second pixel electrodes 150 may be electrically connected to the thin film transistor.

The opposite substrate 200 includes a second base substrate 210, a first common electrode 230 facing the first pixel electrode 130, a second insulating layer 240 covering the first common electrode 230, and a plurality of second common electrodes 250 disposed on the second insulating layer 240.

A common voltage may be applied to the first common electrode 230. The first common electrode 230 may include a transparent conductive material, e.g., indium tin oxide, to allow the light provided from the second base substrate 210 to pass to the electrophoretic layer 300.

The second insulating layer 240 is disposed on the first common electrode 230 to cover the first common electrode 230. The second common electrodes 250, each having a circular shape or a rectangular-shaped island pattern, are disposed on the second insulating layer 240. The second common electrodes 250 may include the transparent conductive material, e.g., indium tin oxide. In addition, each of the second common electrodes 250 may have a same diameter or a same width as that of the second pixel electrodes 150.

Each of the second common electrodes 250 may be disposed in a center position of the lattice shape, and thus the second common electrodes 250 do not overlap with the second pixel electrodes 150. The second common electrodes 250 are electrically connected to the first common electrode 230 to generate an electric field together with the first common electrode 230. The second common electrodes 250 may be electrically insulated from the first common electrode 230 and electrically connected to the driver IC to independently generate the electric field.

The second common electrodes 250 may be omitted from the electrophoretic display apparatus. In this case, the electric field used to control the electrophoretic layer 300 is generated by the second pixel electrode 150.

The electrophoretic layer 300 may include a non-polar solvent 310 and a plurality of polar particles 320 dispersed in the non-polarity solvent 310.

The non-polar solvent 310 may include a dispersive medium and an additive agent, such as a surfactant. In addition, the non-polar solvent 310 has a specific gravity equal to or similar to that of the polar particles 320 so as to substantially prevent the polar particles 320 from being precipitated by gravity. Thus, the polar particles 320 may be substantially prevented from cohering in the pixel areas.

The polar particles 320 may be electrified to a positive (+) polarity or a negative (−) polarity. The movement of the polar particles 320 is controlled by the electric field generated by the second pixel electrodes 150 and the second common electrodes 250. In addition, in a case where the optical functional layer is the white reflective layer 120, the polar particles 320 may be black particles to display a gray scale.

According to an embodiment of the present disclosures, a distance (d) between the second pixel electrodes 150 may be selected according to the following equation 1.

$$2a \leq d \leq 2a+2b \qquad \text{Equation 1}$$

In equation 1, "a" denotes a distance between the array substrate 100 and the opposite substrate 200 and "b" denotes the diameter or the width of the second pixel electrodes 150.

It should be noted that a distance between the second common electrodes 250 may be determined according to Equation 1, such that the distance between different ones of the second common electrodes 250 is substantially the same as the distance (d) between the second pixel electrodes 150 and the diameter or the width of the second common electrodes is substantially the same as the diameter or the width (b) of the second pixel electrodes 150.

That is, the distance (d) between the second pixel electrodes 150 or the distance between the second common electrodes 250 may be two times the distance (a) between the array substrate 100 and the opposite substrate 200. In addition, the distance (d) between the second pixel electrodes 150 or the distance between the second common electrodes 250 may be the sum of two times of the distance (a) between the array substrate 100 and the opposite substrate 200 and the two times of the diameter or the width (b) of the second pixel electrodes 150 or the second common electrodes 250.

According to an embodiment of the present disclosures, the distance (d) between the second pixel electrodes 150 (and the distance between the second common electrodes 250), which generate the electric field to control the movement of the polar particles 320, may be determined according the following equation 2.

$$d = 2a+b \qquad \text{Equation 2}$$

Here, the distance (d) between the second pixel electrodes 150 or the distance between the second common electrodes 250 may be the sum of two times of the distance (a) between the array substrate 100 and the opposite substrate 200 and the diameter or the width (b) of the second pixel electrodes 150 or the diameter or the width of the second common electrodes 250.

Figure 3:
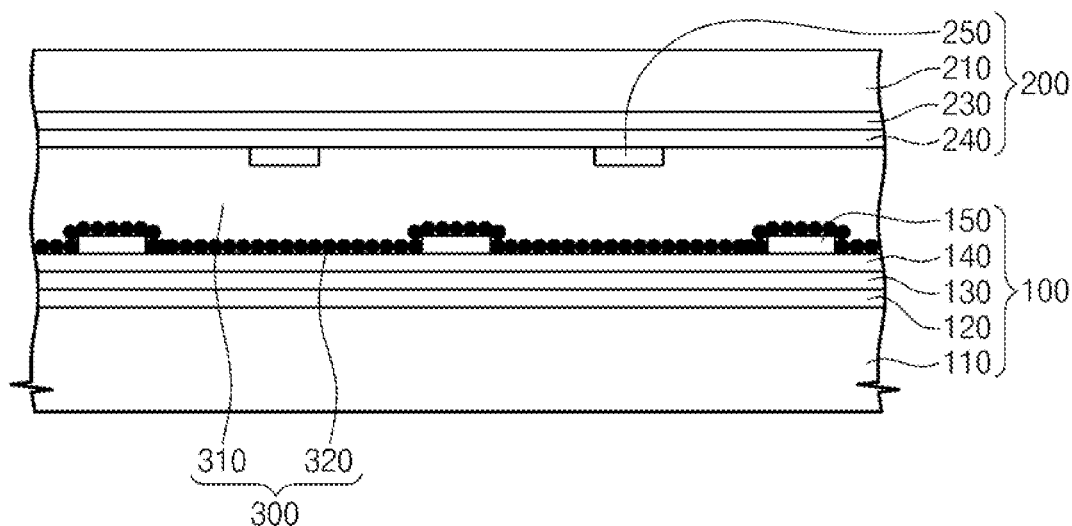
FIGS. 3 to 5 are cross-sectional views showing an operation of the electrophoretic display apparatus shown in FIG. 1.
Figure 4:
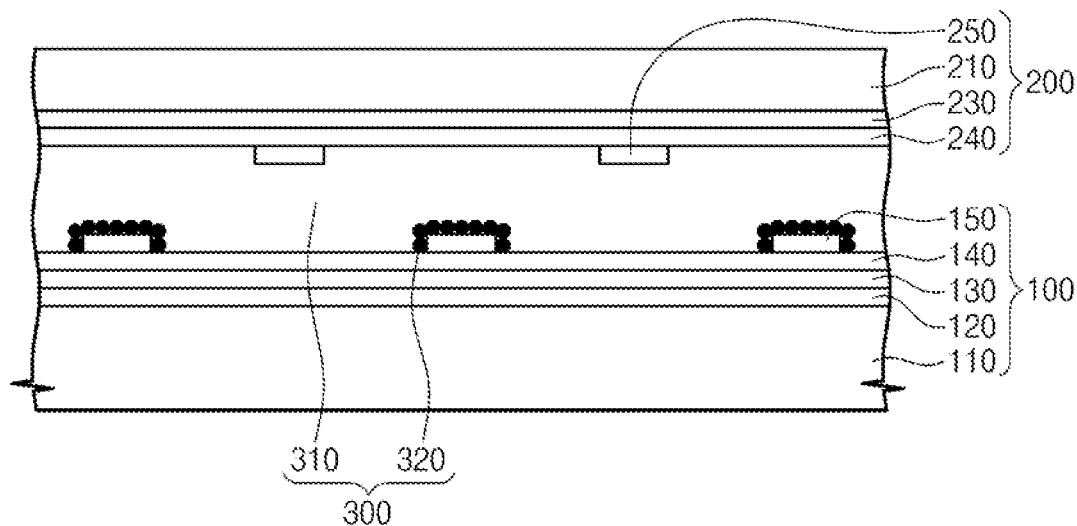
Figure 5:
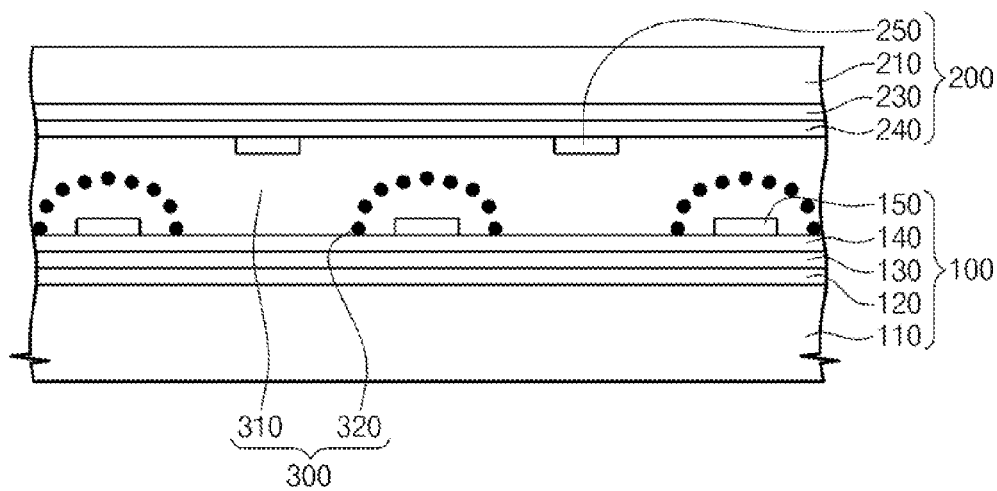
Figure 6:
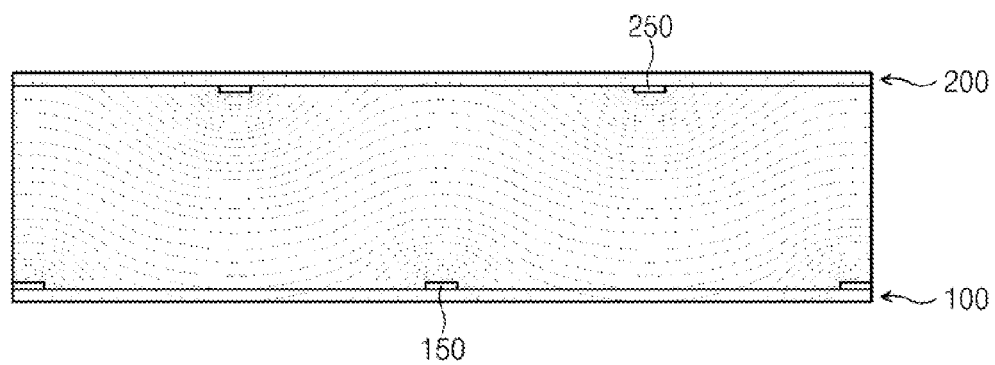
FIG. 6 is a cross-sectional view showing an electric field generated in the electrophoretic display apparatus shown in FIG. 1.
Figure 7:
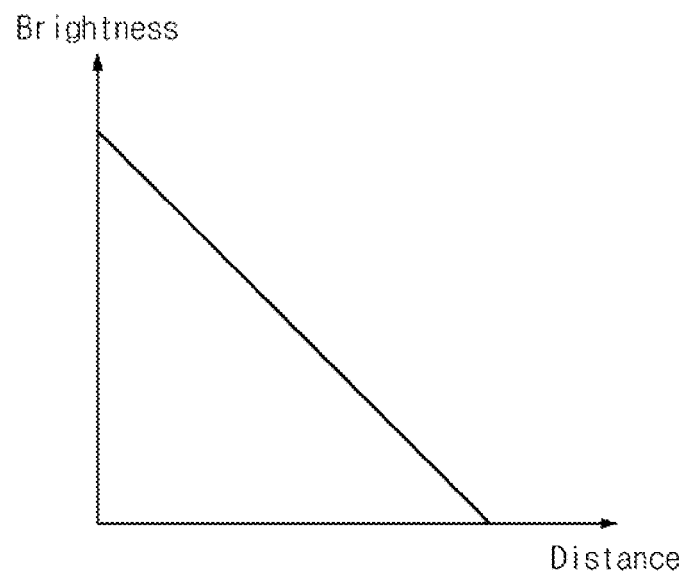
FIG. 7 is a graph showing a gray scale of the electrophoretic display apparatus according to a distribution distance between polarity particles.

FIGS. 3 to 5 are cross-sectional views showing an exemplary operation of the electrophoretic display apparatus shown in FIG. 1. FIG. 6 is a cross-sectional view showing an electric field generated in the electrophoretic display apparatus shown in FIG. 1. FIG. 7 is a graph showing a gray scale of the electrophoretic display apparatus according to a distribution distance between polarity particles.

Referring to FIGS. 3 to 7, when an electric potential difference occurs between the first pixel electrode 130 and the first common electrode 230, an electric field is generated in the electrophoretic layer 300. Under the influence of the electric field, the polar particles 320 move toward either the first pixel electrode 130 or the first common electrode 230. For example, when the polar particles 320 have the negative (−) polarity, the first pixel electrode 130 is applied with a positive (+) voltage, and the first common electrode 230 is applied with zero voltage or a negative (−) voltage, the polar particles 320 move toward the first pixel electrode 130 as shown in FIG. 3 to cover the array substrate 100. When the polar particles 320 cover the array substrate 100, the polar particles 320 may substantially prevent the light incident through the opposite substrate 200 from being reflected by the white reflective layer 120 and the electrophoretic display apparatus displays a black color.

In a case when the second pixel electrodes 150 are applied with the positive (+) voltage and the second common electrodes 250 are applied with the negative (−) voltage while the first pixel electrode 130 and the first common electrode 150 are applied with the zero voltage, the polar particles 320 are concentrated at the second pixel electrodes 150 as shown in FIG. 4. Accordingly, the light incident through the opposite substrate 200 from the outside may be reflected by the white reflective layer 120, and the electrophoretic display apparatus displays a white color.

In a case when the second pixel electrodes 150 are applied with the positive (+) voltage while the first pixel electrode 130, the first common electrode 230, and the second common electrodes 250 are applied with the zero voltage, the polar particles 320 are arranged to be spaced apart from the second pixel electrodes 150 at regular intervals as shown in FIG. 5. In this arrangement, the polar particles 320 are dispersed in the non-polar solvent 310 while being spaced apart from the second pixel electrodes 150 at regular intervals without being concentrated at the second pixel electrodes 150 or covering the array substrate 100. Thus, a portion of the light incident from the outside is reflected by the white reflective layer 120 and a remaining portion of the light incident from the outside is not reflected by the white reflective layer 120 and the electrophoretic display apparatus displays a gray color.

As shown in FIG. 6, when the first pixel electrode 130 and the first common electrode 230 are applied with the zero voltage and the second pixel electrodes 150 and the second common electrodes 250 are applied with either the positive (+) voltage or the negative (−) voltage, a substantially uniform electric field occurs in the electrophoretic layer 300. Accordingly, the polar particles 320 are dispersed in the non-polar solvent 310 along the electric field to maintain a substantially uniform distance from the second pixel electrodes 150 and the second common electrodes 250.

Referring to FIG. 7, a brightness of the electrophoretic display apparatus may be controlled according to the distance between each of the polar particles 320 and the second pixel electrodes 150 and the second common electrodes 250. The distance between each of the polar particles 320 and the second pixel electrodes 150 and the second common electrodes 250 may be controlled by adjusting the level of the voltage applied to the second pixel electrodes 150 and the second common electrodes 250.

When the electric potential difference between the second pixel electrodes 150 and the second common electrodes 250 is increased, the polar particles 320 move toward the second pixel electrodes 150 and the second common electrodes 250. Accordingly, the electrophoretic display apparatus may display the gray color having a relatively high brightness.

In a case when the electric potential difference between the second pixel electrodes 150 and the second common electrodes 250 is decreased, the polar particles 320 move away from the second pixel electrodes 150 and the second common electrodes 250. Accordingly, the electrophoretic display apparatus may display the gray color having a relatively low brightness. That is, as the polar particles 320 are spaced apart from the second pixel electrodes 150 and the second common electrodes 250, the brightness of the electrophoretic display apparatus becomes low.

According to an embodiment of the present disclosure, the electrophoretic display apparatus as the above-described may control the distribution of the electric field by adjusting the level of the voltage applied to the second pixel electrodes 150 and the second common electrodes 250. That is, the electrophoretic display apparatus may control the brightness thereof. Therefore, the electrophoretic display apparatus may control the gray scales.

Figure 8:
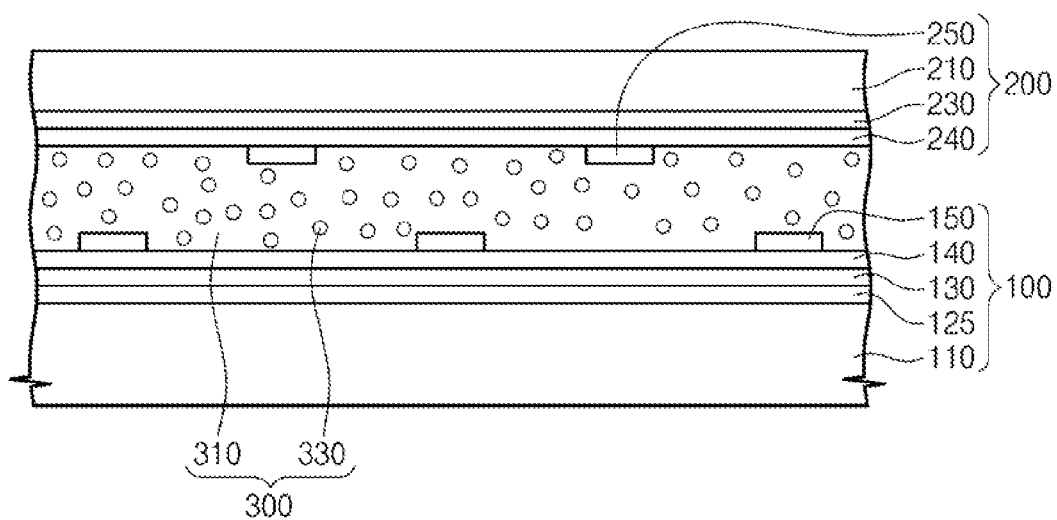
FIG. 8 is a cross-sectional view showing an electrophoretic display apparatus according to an exemplary embodiment of the present disclosure.

FIG. 8 is a cross-sectional view showing an electrophoretic display apparatus according to an exemplary embodiment of the present disclosure. In FIG. 8, the same reference numerals denote the same elements as appear in FIGS. 1 to 7, and thus detailed descriptions thereof will be omitted.

Referring to FIG. 8, the electrophoretic display apparatus includes an anti-reflective layer 125 as the optical functional layer to substantially prevent the external light from being reflected, and a plurality of polar particles 330 may display a white color. The anti-reflective layer 125 may include a black photoresist to substantially prevent the external light from being reflected.

Accordingly, the electrophoretic display apparatus may be driven in an opposite manner to the electrophoretic display apparatus shown in FIG. 1. In detail, when the polar particles 330 cover the array substrate 110, the electrophoretic display apparatus displays the white color. In addition, when the polar particles 330 are concentrated at the second pixel electrodes 150, the electrophoretic display apparatus displays the black color. Further, when the polar particles 330 are dispersed in the non-polar solvent 310 by the electric field generated by the second pixel electrodes 150 and the second common electrodes 250, the electrophoretic display apparatus displays the gray color.

Although exemplary embodiments of the present disclosure have been described, it is understood that the present disclosure should not be limited to these exemplary embodiments but various changes and modifications can be made by one ordinary skilled in the art within the spirit and scope of the present disclosure as hereinafter claimed.

What is claimed is:

1. An electrophoretic display apparatus including a plurality of pixel areas, the electrophoretic display apparatus comprising:
    an array substrate;
    en opposite substrate facing the array substrate; and
    an electrophoretic layer disposed between the array substrate and the opposite substrate and including a non-polar solvent and a plurality of polar particles dispersed in the non-polar solvent,
    wherein the array substrate comprises:
        a first base substrate including a plurality of pixel areas;
        a first pixel electrode disposed in each pixel area on the first base substrate; and
        a plurality of second pixel electrodes disposed on the first pixel electrode,
    wherein the opposite substrate comprises:
        a second base substrate facing the first base substrate;
        a first common electrode facing the first pixel electrode; the first common electrode disposed on the second base substrate; and
        a plurality of second common electrodes disposed on the first common electrode,
    wherein the second pixel electrodes and the second common electrodes are not overlapped with each other in planar view, and
    wherein a distance between the second pixel electrodes and a distance between the second common electrodes satisfies an inequation $2a \leq d \leq 2a+2b$, wherein "a" is as distance between the array substrate and the opposite substrate and "b" is a diameter or a width of the second pixel electrodes for determining the distance between the second pixel electrodes and "b" is a diameter or a width of the second common electrodes for determining the distance between the second common electrodes and "d" is a distance between the second pixel electrodes and a distance between the second common electrode.

2. The electrophoretic display apparatus of claim 1, wherein the second pixel electrodes are arranged in a lattice shape and positioned at cross-positions of the lattice shape to have a first island pattern, and the second common electrodes are positioned at center positions of the lattice shape to be arranged in a second island pattern.

3. The electrophoretic display apparatus of claim 1, wherein the second pixel electrodes are spaced apart from each other at a first regular interval and the second common electrodes are spaced apart from each other at a second regular interval.

4. The electrophoretic display apparatus of claim 1, wherein the distance between the second pixel electrodes and the distance between the second common electrodes satisfy the following equation of $d=2a+b$.

5. The electrophoretic display apparatus of claim 4, wherein the second pixel electrodes and the second common electrodes have a circular shape and the diameter of each of the second pixel electrodes is equal to the diameter of each of the second common electrodes.

6. The electrophoretic display apparatus of claim 4, wherein the second pixel electrodes and the second common electrodes have a rectangular shape and the width of each of the second pixel electrodes is equal to the width of each of the second common electrodes.

7. The electrophoretic display apparatus of claim 1, wherein one of the array substrate and the opposite substrate further comprises a white reflective layer and the polar particles have a black color.

8. The electrophoretic display apparatus of claim 1, wherein one of the array substrate and the opposite substrate further comprises an anti-reflective layer and the polar particles have a white color.

9. The electrophoretic display apparatus of claim 1, wherein the first pixel electrode, the first common electrode, and the second common electrodes are applied with a same electric potential voltage, the second pixel electrodes are applied with an electric potential voltage different from the electric potential voltage applied to the first pixel electrode to control the polar particles to be dispersed in the non-polar solvent to display a gray scale.

10. The electrophoretic display apparatus of claim 1, wherein at least one of the array substrate and the opposite substrate further comprises an optical functional layer.

11. The electrophoretic display apparatus of claim 10, wherein the optical functional layer is a white reflective layer and the polar particles have a black color.

12. The electrophoretic display apparatus of claim 10, wherein the optical functional layer is an anti-reflective layer and the polar particles have a white color.

13. The electrophoretic display apparatus of claim 10, wherein each of the second pixel electrodes and each of the common electrodes have an island pattern.

14. The electrophoretic display apparatus claim 13, wherein the second pixel electrodes are spaced apart from each other at regular intervals and the second common electrodes are spaced apart from each other at regular intervals.

15. The electrophoretic display apparatus of claim 1, further comprising:
a first insulating layer disposed between the first pixel electrode and the second pixel electrode.

16. The electrophoretic display apparatus of claim 1, further comprising:
a second insulating layer disposed between the second base substrate and the plurality of second common electrodes.

17. The electrophoretic display apparatus of claim 1, wherein each of the second pixel electrodes overlaps the first pixel electrode and the first common electrode, and wherein each of the second common electrodes overlaps the first pixel electrode and the first common electrode.

18. The electrophoretic display apparatus of claim 17, wherein the first pixel electrode covers entirely the first base substrate in each pixel areas, and wherein the first common electrode covers entirely the second base substrate in each pixel electrode.

* * * * *